United States Patent [19]

Collette

[11] Patent Number: 4,613,828

[45] Date of Patent: Sep. 23, 1986

[54] INJECTION-LOCKED VIDEO FREQUENCY OSCILLATOR

[75] Inventor: Robert P. Collette, Pavilion, N.Y.

[73] Assignee: Eastman Kodak Company, Rochester, N.Y.

[21] Appl. No.: 748,810

[22] Filed: Jun. 25, 1985

[51] Int. Cl.$^4$ .............................................. H03B 1/04
[52] U.S. Cl. ...................................... 331/47; 331/55; 358/31
[58] Field of Search ....................... 331/46, 47, 55, 56, 331/158; 358/31, 195.1

[56] References Cited

U.S. PATENT DOCUMENTS 3,996,610 12/1976 Kawamoto ............................ 358/31
4,195,309 3/1980 Christopher et al. .................. 358/31

OTHER PUBLICATIONS

Electronics Designers' Handbook, ed. by R. W. Landee et al, McGraw-Hill Book Co., 1977, (pp. 16-3 to 16-8).

Primary Examiner—Eugene R. LaRoche
Assistant Examiner—Robert J. Pascal
Attorney, Agent, or Firm—David M. Woods

[57] ABSTRACT

A pair of crystal-controlled oscillators generate respective signals at specific frequencies that are useful in processing a video signal, such as in providing clock-driven signal delay or producing a subcarrier signal. The frequencies are used in such a way that they feed through into the frequency spectrum of the processed video signal. Though the frequencies are nominal multiples of each other they cannot be maintained invariant because of normal circuit conditions, such as ambient temperature variations and circuit aging. The frequencies therefore mix and a difference frequency develops in the processed video signal. By injecting a suitable harmonic of the lower frequency signal into the crystal oscillator generating the higher frequency signal, the higher frequency will lock to variations in the lower frequency. The difference frequency consequently disappears.

13 Claims, 1 Drawing Figure

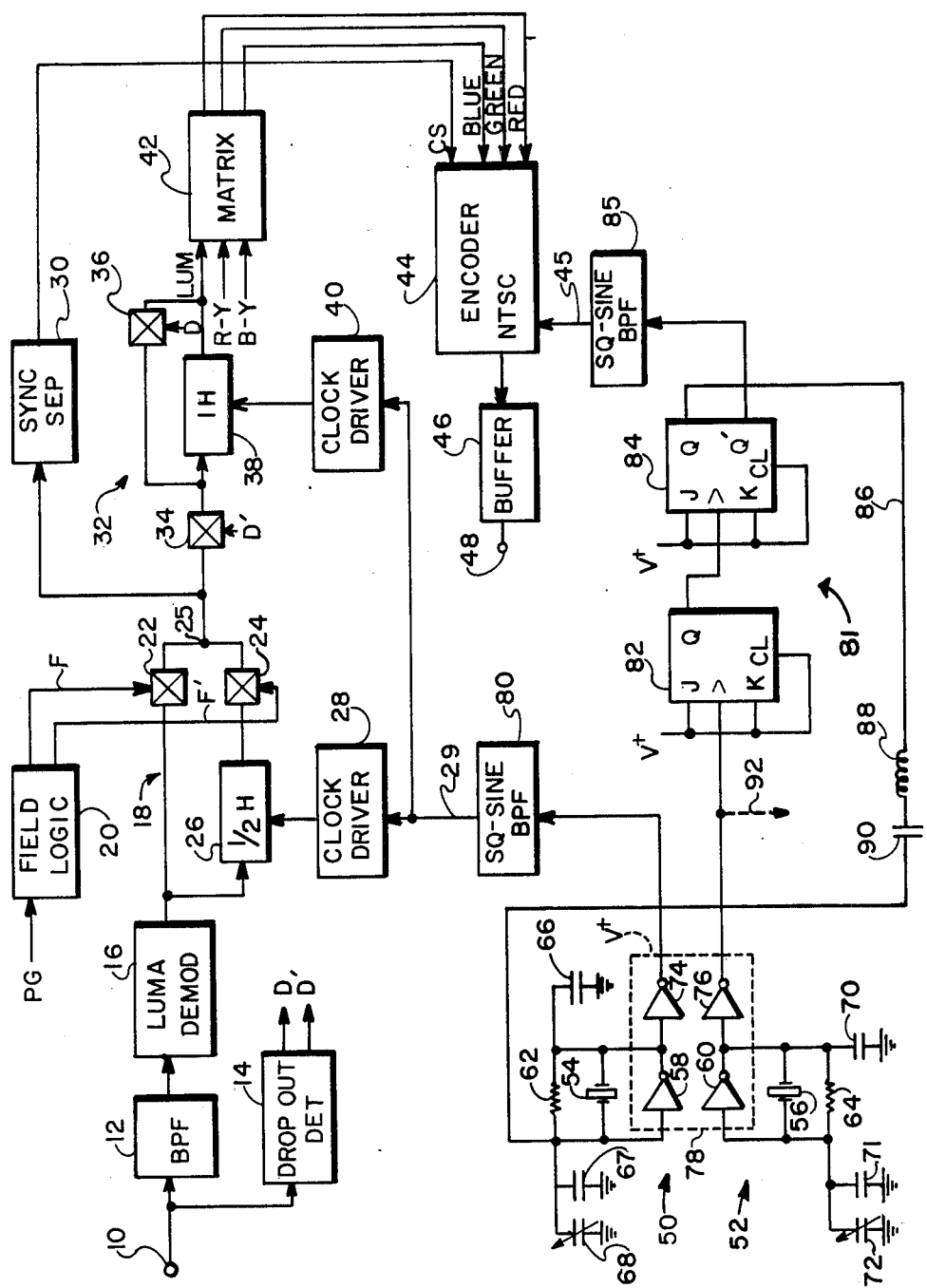

INJECTION-LOCKED VIDEO FREQUENCY OSCILLATOR

BACKGROUND OF THE INVENTION

1. Field of the Invention

This invention pertains to crystal-controlled oscillators, especially oscillators included in a video circuit to generate signals having crystal-controlled frequencies that are useful in processing a video signal.

2. Description Relative to the Prior Art

Sometimes it is necessary to utilize several locally-generated video frequency signals in the processing of a signal bearing video information. For instance, a color subcarrier signal of 3.58 mHz is ordinarily generated in a video player and used to reconstruct a composite video signal in a form suitable for display by a color television receiver. In addition, one or more delay lines are frequently employed for drop-out compensation, comb filtering and like functions requiring video signal delay. With a clock-driven delay device, such as a charge-coupled device (CCD), a local source of a clock frequency signal is required.

A simple and direct way to obtain the necessary local frequencies is to dedicate a crystal-controlled oscillator to the generation of each needed frequency signal. In the case of the color subcarrier and the CCD clock signals, frequencies generated for these purposes will be incorporated in the spectrum of the output video signal. The color subcarrier signal is there as an important component of the reconstructed composite signal. But the clock signal also feeds through the delay line and into the video signal; subsequent filtering attenuates most . . . but not all . . . of the clock signal, leaving a remnant in the output video signal. This frequency remnant is the problem: Unless the frequency of the clock signal exactly tracks the corresponding harmonic frequency of the color subcarrier signal, the harmonic of the subcarrier signal will mix (heterodyne) with the attenuated clock signal and a spurious difference frequency will appear in the composite signal. With separate oscillators as frequency sources this problem is difficult to avoid since temperature changes, circuit aging and crystal differences virtually assure slight frequency differences, even if the two oscillators can be started in phase and at the same frequency. The spurious difference frequency will ordinarily be a relatively low frequency and appear as visible interference in a picture reproduced from the composite signal.

Phase locking is a technique for keeping two frequency signals in lockstep phase, and therefore at the same frequency. U.S. Pat. No. 3,996,610 describes a video processing system with two phase-locked loops, one loop for operating a clock-controlled delay line (used as a comb filter) and the other for providing a color subcarrier signal to reconstruct a composite video signal. In this patent the two phase-locked loops are essentially independent: the delay line's clock is frequency-locked to the frequency of the recovered color burst signal (which is varying due to fluctuations in the recovery apparatus) and the color subcarrier frequency is locked to a 3.58 mHz frequency from a crystal oscillator. Though the nominal clock frequency (10.7 mHz) is a multiple of the color subcarrier frequency (3.58 mHz), these frequencies are not locked together.

Although the phase-locked loop provides a technical approach to the problem of unwanted signal mixing, it has practical difficulties since it is a complex circuit involving several components. Besides a voltage-controlled oscillator, each phase-locked loop requires a phase detector. In many pieces of consumer equipment it is desirable to reduce the number of parts and simplify the circuits as much as possible, since complexity often equates with cost. Except for the problem of heterodyning, a crystal oscillator is often preferred.

SUMMARY OF THE INVENTION

A frequency-locked condition can be obtained according to the invention while retaining the simplicity of separate crystal-controlled oscillators for each frequency. This is done in a video circuit that utilizes several signals having frequencies that are nominal multiples of each other, such as a clock signal whose frequency is a nominal multiple of a color subcarrier frequency. Two crystal-controlled oscillators are used: one oscillator generates the lower frequency signal, such as the color subcarrier signal, and the other oscillator generates its nominal multiple, such as the clock signal. By coupling the appropriate harmonic of the lower frequency signal to the oscillator generating the higher frequency signal, it has proven possible to injection-lock the second oscillator to the harmonic of the first oscillator. The two frequencies . . . the higher frequency and the harmonic of the lower frequency . . . consequently have a fixed and unvarying phase relationship and will not interfere though they both feed through to the composite video signal.

According to the preferred embodiment, the clock signal is provided directly by an oscillator operating at the clock frequency. The color subcarrier signal is provided by an oscillator operating at a multiple of the color subcarrier frequency. The signal directly produced by the latter oscillator is divided down to the color subcarrier frequency; the third harmonic of the divided-down signal is coupled back to the oscillator generating the clock signal.

BRIEF DESCRIPTION OF THE DRAWINGS

The invention will be described with reference to the drawing, in which a video circuit is shown having two crystal-controlled oscillators, one injection-locked to the other according to the invention.

DETAILED DESCRIPTION OF THE PREFERRED EMBODIMENT

The preferred embodiment is described in connection with the playback circuit of a video player. Since video players are well known in which video signals are reproduced from magnetic media such as magnetic tape or disk, the present description will be directed in particular to elements forming part of, or cooperating more directly with, the present invention. Certain elements that are described are helpful in showing how the locally-generated frequency signals are used in a typical video player and, as such, should not be seen as limiting application of the invention. Other elements not specifically shown or described herein may be selected from those known in the art. The preferred embodiment is described with particular reference to a video system in which single fields of video information are recorded on separate, concentric tracks on a small, flexible magnetic disk. Each field represents a separate still picture. The recorded video signal is a composite color video signal having luminance and chrominance information frequency-modulated on suitable carriers. The video player recovers the recorded composite signal and converts it into another composite signal more suitable for display purposes.

Referring now to the drawing, the circuit shown will be mainly described in connection with the processing of the luminance information and, specifically, the circuit locations where locally-generated frequency signals are employed for signal delay or reconstruction. After that, the generation of the frequency signals themselves will be described. The recovered composite video signal—i.e., a signal which comprises luminance, chrominance, and sync information—is applied to the video circuit at an input terminal 10. The luminance (and sync) information are separated from the chrominance information by a luminance band-pass filter 12. The composite signal is provided separately to a dropout detector 14, which monitors the envelope of the composite signal and forms a switching signal when a transient is detected indicative of a dropout. (A dropout is the designation given to information found to be missing after the composite video signal has been recorded and reproduced from the magnetic disk.) Two output signals are provided by the detector 14: a signal D' indicates the absence of a dropout and a signal D the presence of a dropout.

The modulated luminance information from the filter 12 is demodulated by a luminance demodulator 16 and the resulting baseband luminance signal is applied to a field interlacer 18. Two fields are generated from one recorded field and interlaced to produce a frame. As each field is treated separately, and differently, it is necessary to identify them. This is accomplished by a field logic array 20, which monitors the occurrence of a signal PG that is generated once for each revolution of the magnetic disk prior to the vertical synchronization interval (each recorded field occupies one circular track on the disk and the signal PG is synchronized to the beginning of each field). The logic array 20 alternately switches the levels of a (first) field switching signal F and a (second) field switching signal F'. The signal F represents the recorded, i.e., the lace, field and the signal F' represents the interlaced field.

The field interlacer 18 sets the two fields in proper sequence by branching the baseband luminance signal from the demodulator 16 to two video field switches 22 and 24. The switches 22 and 24 are triggered at the field rate by the switching signals F and F' so that one field passes through one branch and, during the next disk revolution, the other branch, and so on in alternating sequence. In that way a full-frame signal is available at an output 25 of the field interlacer 18. In order to present an interlaced standard format signal, the luminance signal intended for the interlaced (second) field is given a half-line delay by a delay line 26 prior to switching. The delay line 26 is a conventional clock-controlled charge-coupled device (CCD). The delay provided by the CCD delay line 26 is controlled by waveforms provided from a clock driver 28. The clock driver 28 responds to an applied clock signal on a line 29 and generates suitably phased clock driving waveforms that are coupled to the appropriate clock terminals of the CCD delay line 26. Though the clock frequency could be any frequency that meets sampling requirements, commercially-available CCD delay lines commonly operate at some multiple of the NTSC color subcarrier frequency (i.e., at some multiple of 3.58 mHz).

The composite synchronization information (including both horizontal and vertical components) is extracted from the luminance signal by a synchronization separator circuit 30. The baseband full-frame luminance signal is also provided to a dropout compensator 32 comprised of an input switch 34, a feedback switch 36 and a CCD delay line 38. The CCD delay line 38 provides a one-line delay according to suitably phased clock driving waveforms from a clock driver 40. The CCD delay lines 26 and 38 operate at the same multiple of the color subcarrier frequency so that a common clock signal on the line 29 can be applied to both clock drivers 28 and 40. The signals D and D' from the dropout detector 14 determine the states of the switches 34 and 36. In the absence of a dropout, the luminance signal passes through the closed input switch 34 and into the one-line CCD delay line 38. The feedback switch is held open by the condition of the signal D. When a dropout is detected, the conditions of the switches are reversed. Then, for the duration of the dropout, the luminance signal at the output of the delay line 38 is fed back to its input through the closed switch 36 while the open switch 34 blocks passage of the dropout. The effect is to have a line section from a preceding line substituted for the dropped-out portion.

The dropout-free luminance signal and similarly processed color difference signals R-Y and B-Y are provided to a conventional matrix circuit 42. (The R-Y and B-Y signals are conventionally derived from the chrominance information of the composite signal.) A conversion of these input signals to red, green and blue signals is performed by the matrix 42. These red, green and blue signals, as well as the composite synchronization signal CS from the snyc separator 30, are applied to an encoder 44, where they are processed into a standard format NTSC composite video signal. In order to construct an NTSC format, a color subcarrier signal is provided to the encoder 44 on an input line 45. The composite video signal is passed through a buffer amplifier 46 to an output terminal 48.

A pair of crystal-controlled oscillators 50 and 52 generate the clock signal provided to the clock drivers 28 and 40 and the color subcarrier signal provided to the encoder 44. The oscillator 50 includes a quartz crystal 54, which vibrates at a frequency of 10.738635 mHz, connected across an inverter 58 and a bias resistor 62. The oscillator's load capacitance, comprising fixed capacitors 66 and 67 and a variable capacitor 68, is distributed relative to both sides of the crystal 54 for increased stability. By adjusting the variable capacitor 68, the operating frequency of the oscillator 50 can be slightly varied. An additional inverter 74 "squares up" the oscillations from the inverter 58 and provides a square-wave output signal. The square-wave signal, which stems from the oscillator 50, is converted into a sine wave (required for driving the delay lines) by a square-to-sine bandpass filter 80 having a frequency characteristic that sharply attenuates the higher harmonics of the square-wave signal. The sine-wave output signal from the bandpass filter 80 is provided to the clock drivers 28 and 40.

The oscillator 52 is configured similarly to the oscillator 50, excepting that it operates at a different frequency—one that is the fourth multiple of the subcarrier frequency—and includes a frequency divider 81 for obtaining the subcarrier frequency from the oscillation frequency. A quartz crystal 56, which vibrates at a frequency is of 14.31818 mHz, is connected across an inverter 60 and a bias resistor 64. The load capacitors include fixed capacitors 70 and 71, and a variable capacitor 72 for small frequency adjustments. An inverter 76 applies a square-wave oscillation signal to the divider 81. A pair of JK flip-flops 82 and 84 are connected as shown in the drawing to divide the incoming signal—applied to the clock input of the first flip-flop 82—by four. (The flip-flop pair can be obtained as a 74HC107 dual JK flip-flop with reset.)

The output signal associated with the oscillator 52 is taken from the Q' output port of the second flip-flop 84; it is a square-wave signal having a frequency of 3.579545 mHz, that is, the color subcarrier frequency. The square-wave signal from the oscillator 52 is converted into a sine-wave signal by a square-to-sine bandpass filter 85, which has a frequency characteristic that attenuates the higher harmonics of the square wave color subcarrier signal. The sine-wave output from the filter 85 is applied to the encoder 44 and used in the construction of a standard-format NTSC video signal.

The oscillator 52 generates an intermediate oscillation signal at the fourth harmonic of the color subcarrier signal . . . and then divides it down to obtain the color subcarrier signal . . . because the intermediate oscillation signal is diverted (as shown by a broken line 92) for use in another part (not shown) of the video player circuit. Were it not for this additional use for the oscillator 52, it could directly generate the color subcarrier signal at the output of the inverter 76 and the frequency divider 81 could be eliminated. The four inverters included in the oscillators 50 and 52 are shown enclosed by broken line 78 since it is convenient to obtain them in an integrated circuit package, such as a 74HCO4 hex inverter. (If there are unused inverters, as in a hex configuration, it is advisable to ground all the unused inputs.) A source of voltage V+ is applied to the inverter package 78 to bring the circuits into oscillation.

The baseband luminance signal provided to the CCD delay lines 26 and 38 is sampled for every cycle of the clock signal. Thus it is conventional, according to well-known sampling practice, to use low-pass filters (which are not shown separately but are routinely included with a delay line) for limiting the input and output signals of each delay line 26 and 38 to half (or less) the clock frequency. The clock frequency, which forms the high end of the frequency spectrum of the output signal of each delay line, is sharply attenuated by the "included" output low-pass filter. However it is not practical to employ a filter that completely eliminates the sampling frequency . . . in part because the sharper the attenuation the more the bandwidth rolls off into desirable frequencies. This becomes a particular problem if there is a very close frequency in the spectrum with which the remnant of the clock frequency can mix. In the circuit shown by the drawing, there is such a frequency: the third harmonic of the color subcarrier frequency. The color subcarrier signal is inserted into the processing chain at the encoder 44 and, though substantially free of higher harmonics due to the filter 85, a remnant of its third harmonic leaks into the frequency spectrum. If this third harmonic frequency is exactly the same—and stays the same—as the clock frequency, there is no interference, and therefore no problem. But it seldom is, because circuit aging, temperature drift and like variations cause at least a few cycles difference between the two frequencies. A difference frequency is therefore generated by the clock signal mixing (heterodyning) within the encoder 44 with the third harmonic of the color subcarrier signal. The resulting interference (difference) frequency is well within the desirable video frequencies and noticeably shows in a picture reproduced from the video signal.

A feedback connection 86 from the divided-down output of the oscillator 52 (providing the color subcarrier signal) to the oscillator 50 (providing the clock signal) provides the solution to this problem. The feedback signal is the complement of the color subcarrier signal and is taken from the Q output port of the second flip-flop 84. This signal, being a square wave, is rich in odd harmonic content, including the third harmonic . . . which is nominally the same frequency as the clock signal. The third harmonic of the color subcarrier signal is separated by a series-resonant filter comprising an inductor 88 and a capacitor 90 and injected into the oscillator 50 at the input side of the inverter 58. When the oscillators are energized and the frequency of the injected signal begins to deviate from the oscillation frequency of the oscillator 50, the oscillation frequency will shift to the injected frequency. In other words, the phase of the oscillations will track the phase of the injected signal. The oscillator 50 is thus injection-locked to the third harmonic of the divided-down frequency from the oscillator 52. As circuit conditions change, the two frequencies (phases) will change with the conditions but they will always be locked to each other. By keeping the frequency (phase) of the oscillator 50 the same as the injected frequency, the clock signal will have a fixed and unvarying phase relationship with the third harmonic of the color subcarrier signal present at the encoder 44. (The phase relationship can be other than a zero difference as long as the difference is fixed and unvarying.) The mixing problem in the video signal is thus eliminated and the accompanying low-frequency interference no longer shows in the reproduced picture.

One might be inclined to select values for the series-resonant filter (capacitor 90 and inductor 88) which produce resonance at the third harmonic of the color subcarrier signal. This has proven, however, to be an occasional problem in operating the oscillator 50 at the nominal frequency of the crystal 54 . . . probably because the oscillator 50 sees a low-impedance "short-circuit" at its resonant frequency. If the resonant frequency of the series-resonant circuit is offset a bit from the third harmonic so that the oscillator 50 does not see such low impedance, the oscillator 50 performs adequately. For example, a capacitance value of 12 pf. and an inductance value of 22 $\mu$h were selected respectively for the capacitor 90 and the inductor 88 (a 10 pf. capacitor would have caused resonance at the third harmonic). It was however noted that other circuit capacitances influence this "offset", and indeed may mask it entirely, so that a 10 pf. capacitor may function quite well when an actual oscillator circuit is assembled. In other words, the actual value of the components is an empirical determination based on the performance of the oscillator 50.

It is not necessary that the feedback signal be a square-wave complement of the color subcarrier signal. The Q output port of the second flip-flop 84 was used for the feedback signal simply because it was available (moreover, the port connections can be reversed without effect). The feedback signal could also be taken directly from the same port that provides the signal to the square-to-sine bandpass filter 85 (although some undesirable loading effects may have to be contended with).

The invention has been described in detail with particular reference to a presently preferred embodiment, but it will be understood that variations and modifications can be effected within the spirit and scope of the invention.

What is claimed is:

1. A video circuit that generates several frequency signals for such use during the processing of a video signal that the frequency signals appear in the frequency spectrum of the output video signal, said video circuit comprising:

first crystal-controlled oscillator means for generating a first frequency signal;

second crystal-controlled oscillator means for generating a second frequency signal that is nominally a multiple of the frequency of said first frequency signal; and feedback means responsive to said first frequency signal for locking the oscillation frequency of said second oscillator means to variations of a corresponding harmonic component of said first frequency signal.

2. A video circuit as claimed in claim 1 in which said second crystal-controlled oscillator means includes a quartz crystal connected across a first inverter for resonating at said second frequency and a second inverter connected to the output of said first inverter for providing a square-waveform constituting said second frequency signal.

3. A video circuit as claimed in claim 2 in which said feedback means comprises a filter for separating said corresponding harmonic component from said first frequency signal and circuit means for applying said separated harmonic component to the input of said first inverter.

4. A video circuit as claimed in claim 1 in which said first crystal-controlled oscillator means comprises an oscillator operating at a frequency multiple of said first frequency signal and a dividing circuit connected to said oscillator for providing said first frequency signal.

5. A video circuit that generates several frequency signals that are used in the processing of a video signal, the frequency signals being capable of mixing within the output video signal and causing an interference signal to appear therewith, said video circuit comprising:

a first oscillator having a first crystal resonating circuit for generating a first frequency signal;

a second oscillator having a second crystal resonating circuit for generating a second frequency signal, said second frequency signal being a nominal frequency multiple of said first frequency signal;

means for separating a harmonic component from said first frequency signal that is approximately equal in frequency to said second frequency signal; and means for coupling said separated harmonic component to said second crystal resonating circuit so that the oscillation frequency of said second frequency signal is locked to frequency variations of said separated harmonic component, thereby causing the interference signal to disappear.

6. A video circuit as claimed in claim 5 in which said second oscillator includes a crystal connected across the first of a pair of inverters arranged to provide a square waveform for said second frequency signal.

7. A video circuit as claimed in claim 6 in which said means for separating a harmonic component comprises a series-resonant filter connected to receive said first frequency signal and to provide said harmonic component thereof to the input of the first of said pair of inverters.

8. A video circuit as claimed in claim 7 in which said first oscillator comprises a square-wave oscillator that operates at a multiple of the frequency of said first frequency signal and a divider that provides said first frequency signal from the output of said square-wave oscillator.

9. A video circuit that utilizes a color subcarrier in the generation of a composite signal and a clock signal in the operation of a clock-controlled delay line, said circuit comprising:

first oscillator means for generating a color subcarrier signal;

second oscillator means for generating a clock signal, the frequency of the clock signal being a nominal multiple of the frequency of the color subcarrier signal; and means for coupling a harmonic of the color subcarrier signal to said second oscillator means in order to lock the frequency of the clock signal to the frequency of the color subcarrier signal.

10. A video circuit as claimed in claim 9 in which said first and second oscillator means are crystal-controlled oscillators.

11. A video circuit that utilizes a clock signal for operating a clock-driven delay line and a color subcarrier signal for encoding a composite video signal from a video signal delayed in the delay line, the clock and color subcarrier signals mixing in said composite video signal and potentially causing an interference signal to appear therewith insofar as the frequency of the clock signal differs from a corresponding harmonic component of the subcarrier signal, said circuit comprising:

first oscillator means for generating a color subcarrier signal having a subcarrier frequency and said corresponding harmonic component thereof;

second oscillator means for generating a clock signal having a frequency that is a nominal multiple of said color subcarrier frequency;

filter means responsive to said color subcarrier signal for separating said harmonic component thereof that corresponds in frequency to said clock frequency;

means for coupling said separated harmonic component into said second oscillator means such that said clock frequency follows the variations of said separated harmonic component, thereby eliminating any frequency difference therebetween and causing the interference signal to disappear.

12. A video circuit as claimed in claim 11 in which said first and second oscillator means comprise respective first and second crystal-controlled oscillators.

13. The video circuit as claimed in claim 11 in which said first oscillator means comprises a crystal-controlled oscillator for generating a frequency multiple of the color subcarrier frequency and a dividing circuit for dividing the multiplied frequency down to the color subcarrier frequency.

* * * * *